US009961505B2

(12) United States Patent
Tomida et al.

(10) Patent No.: US 9,961,505 B2
(45) Date of Patent: May 1, 2018

(54) RADIO COMMUNICATION TERMINAL AND RADIO COMMUNICATION METHOD

(71) Applicant: CASIO COMPUTER CO., LTD., Shibuya-ku, Tokyo (JP)

(72) Inventors: Takahiro Tomida, Hamura (JP); Yuji Tabata, Ome (JP); Yoshiaki Nakamura, Ome (JP); Tsutomu Terazaki, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 132 days.

(21) Appl. No.: 14/831,613

(22) Filed: Aug. 20, 2015

(65) Prior Publication Data
US 2016/0080912 A1    Mar. 17, 2016

(30) Foreign Application Priority Data

Sep. 17, 2014    (JP) ................................. 2014-188759

(51) Int. Cl.
*H04W 24/00*    (2009.01)
*H04W 4/04*    (2009.01)
(Continued)

(52) U.S. Cl.
CPC ............. *H04W 4/04* (2013.01); *G01S 5/0072* (2013.01); *G01S 5/02* (2013.01)

(58) Field of Classification Search
None
See application file for complete search history.

(56) References Cited

U.S. PATENT DOCUMENTS 6,385,458 B1 * 5/2002 Papadimitriou ........ H04W 4/02
455/432.2
8,040,219 B2    10/2011 Haartsen et al.
(Continued)

FOREIGN PATENT DOCUMENTS

JP    2007096838 A    4/2007
JP    2008177833 A    7/2008
(Continued)

OTHER PUBLICATIONS

Translation_Nagasaki_JP2008-177833A_07-31-2008.pdf.*
(Continued)

*Primary Examiner* — Meless Zewdu
*Assistant Examiner* — Alexander Yi
(74) *Attorney, Agent, or Firm* — Holtz, Holtz & Volek PC

(57) ABSTRACT

A radio communication terminal receives position information showing a position of another radio communication terminal. The radio communication terminal obtains, from the position information, a terminal ID of the radio communication terminal, and a beacon ID for identifying the predetermined location nearest to the radio communication terminal. The radio communication terminal accepts the predetermined location designated by a user. The radio communication terminal determines as a communication partner terminal, the other radio communication terminal that is nearest to the accepted predetermined location based on the terminal ID and the beacon ID. The radio communication terminal performs communication with the determined communication partner terminal.

9 Claims, 10 Drawing Sheets

(51) Int. Cl.
    *G01S 5/00*     (2006.01)
    *G01S 5/02*     (2010.01)

(56) References Cited

U.S. PATENT DOCUMENTS

| | | | |
|---|---|---|---|
| 2010/0067549 A1* | 3/2010 | Nomura | H04L 12/2854 |
| | | | 370/474 |
| 2010/0109864 A1 | 5/2010 | Haartsen et al. | |
| 2011/0281519 A1* | 11/2011 | Reuss | H04W 8/005 |
| | | | 455/41.2 |
| 2013/0012129 A1* | 1/2013 | Shibata | H04W 8/005 |
| | | | 455/41.2 |
| 2016/0234649 A1* | 8/2016 | Finnerty | G01S 1/08 |
| 2016/0309421 A1* | 10/2016 | Kim | H04W 52/283 |

FOREIGN PATENT DOCUMENTS

| | | | |
|---|---|---|---|
| JP | 2011185646 A | 9/2011 | |
| JP | 2012507701 A | 3/2012 | |

OTHER PUBLICATIONS

Japanese Office Action (and English translation thereof) dated Aug. 23, 2016, issued in counterpart Japanese Application No. 2014-188759.

\* cited by examiner

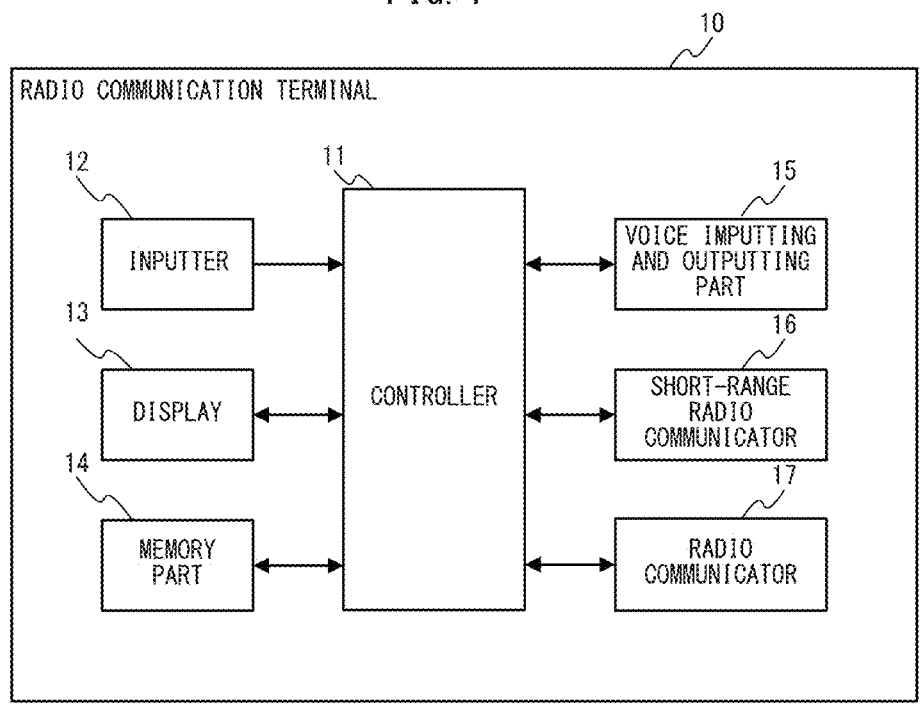

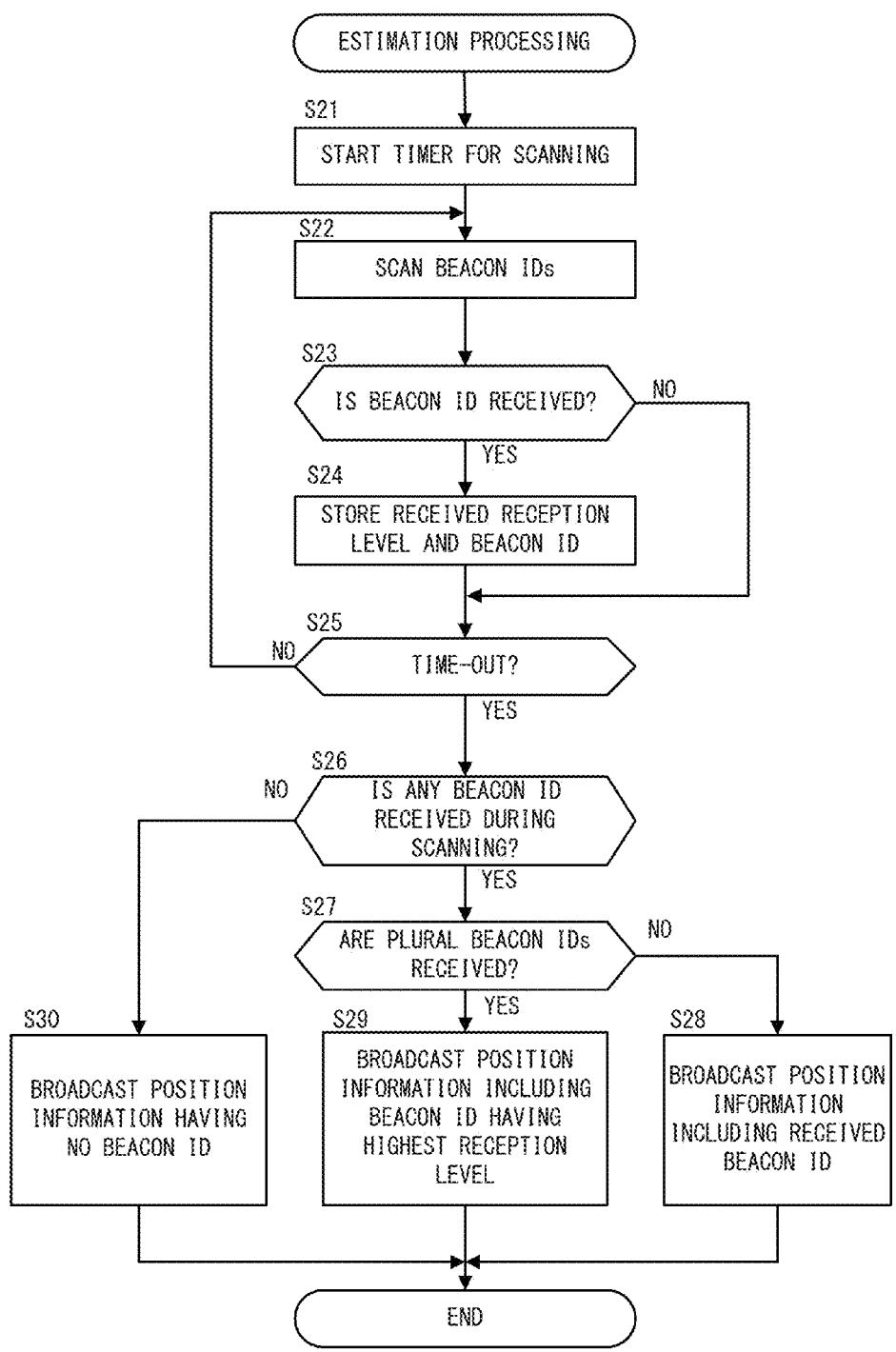

POSITION INFORMATION

| TERMINAL ID | BEACON ID OF NEAREST BEACON DEVICE |

POSITION TABLE

| TERMINAL ID | BEACON ID | LOCATION |
|---|---|---|
| 20 | 2 | VEGETABLE CORNER |
| 30 | 3 | MEAT CORNER |
| ... | ... | ... |

| LOCATION | NUMBER OF TERMINALS |
|---|---|
| WHOLE | 8 |
| REGISTER | 3 |
| VEGETABLE CORNER | 1 |
| MEAT CORNER | 1 |
| FRESH FISH CORNER | 2 |
| PREPARED FOOD CORNER | 1 |

FIG. 13

MANAGEMENT TABLE

| BEACON ID | LOCATION | UNIQUE ADDRESS LIST |
|---|---|---|
| — | WHOLE | 192.168.1.101, 192.168.1.102, 192.168.1.103 192.168.1.104, 192.168.1.105, 192.168.1.106 192.168.1.107, 192.168.1.108 |
| 1 | REGISTER | 192.168.1.101, 192.168.1.106, 192.168.1.108 |
| 2 | VEGETABLE CORNER | 192.168.1.102 |
| 3 | MEAT CORNER | 192.168.1.103 |
| 4 | FRESH FISH CORNER | 192.168.1.104, 192.168.1.107 |
| 5 | PREPARED FOOD CORNER | 192.168.1.105 |

RADIO COMMUNICATION TERMINAL AND RADIO COMMUNICATION METHOD

This application claims the benefit of Japanese Patent Application No. 2014-188759, filed on Sep. 17, 2014, the entire disclosure of which is incorporated by reference herein.

FIELD

The present disclosure relates to a radio communication terminal and a radio communication method.

BACKGROUND

Conventionally, radio communication terminals capable of broadcast communication, such as a transceiver, have been widely used outdoors and indoors as a communication means among workers.

These days, radio communication terminals capable of transmission merely to specific radio communication terminals by connection to a wireless LAN or the like, as well as the broadcast communication, are also widely used.

As for a radio communication terminal, Patent Literature 1 discloses a controlling technology for preventing a radio communication terminal in a group consisting of a plurality of radio communication terminals from performing transmission to the other radio communication terminals in the same group when the terminal performs transmission to the outside of the group (Unexamined Japanese Patent Application Kokai Publication No. 2007-96838).

When the radio communication terminals are used for business, a user of terminal may want to make a call to any person staying at a specific location, not only to a specific person. For example, the user may want to perform transmission to make a call merely to a radio communication terminal existing in the periphery of a specific location inside a large store.

Even under such a situation, it has been necessary to identify a radio communication address desired for communication.

SUMMARY

An exemplary object of the present disclosure is to provide a radio communication terminal that does not require to specify directly an address of another radio communication terminal.

A first exemplary aspect of the present disclosure is a radio communication terminal that comprises a radio communicator, the radio communication terminal comprising: a beacon receiver which receives beacon identification information from a beacon transmitter that is located in a location near the radio communication terminal out of a plurality of the beacon transmitters respectively located at a plurality of locations, the beacon identification information being associated with the location; an information transmitter which wirelessly transmits the received beacon identification information and a terminal identification information of the self-terminal in response to the reception of the beacon identification information associated with the location; a storage controller which, when terminal identification information of another radio communication terminal and the beacon identification information are received from the other radio communication terminal, stores in a memory the terminal identification information and the beacon identification information associated with each other; and a communicator which, when the beacon identification information associated with a desired location is arbitrarily selected, identifies the terminal identification information associated with the selected beacon identification information, the terminal identification information being stored in the memory, and selects the radio communication terminal to which the identified terminal identification information is assigned as a communication partner that is located at the desired location, thereby performs communication with the radio communication terminal.

With the present disclosure, it is possible to communicate wirelessly without identifying the address of the radio communication terminal to be called.

BRIEF DESCRIPTION OF THE DRAWINGS

A more complete understanding of this application can be obtained when the following detailed description is considered in conjunction with the following drawings, in which:

FIG. 4 illustrates a block diagram of a configuration example of a radio communication terminal of the exemplary embodiment;

FIG. 5 illustrates an example of a management table;

FIG. 6 illustrates an example of a flowchart of estimation processing;

FIG. 13 illustrates another example of the management table.

DETAILED DESCRIPTION

Hereafter, the exemplary embodiments of the present disclosure are explained with reference to the drawings.

Figure 1:
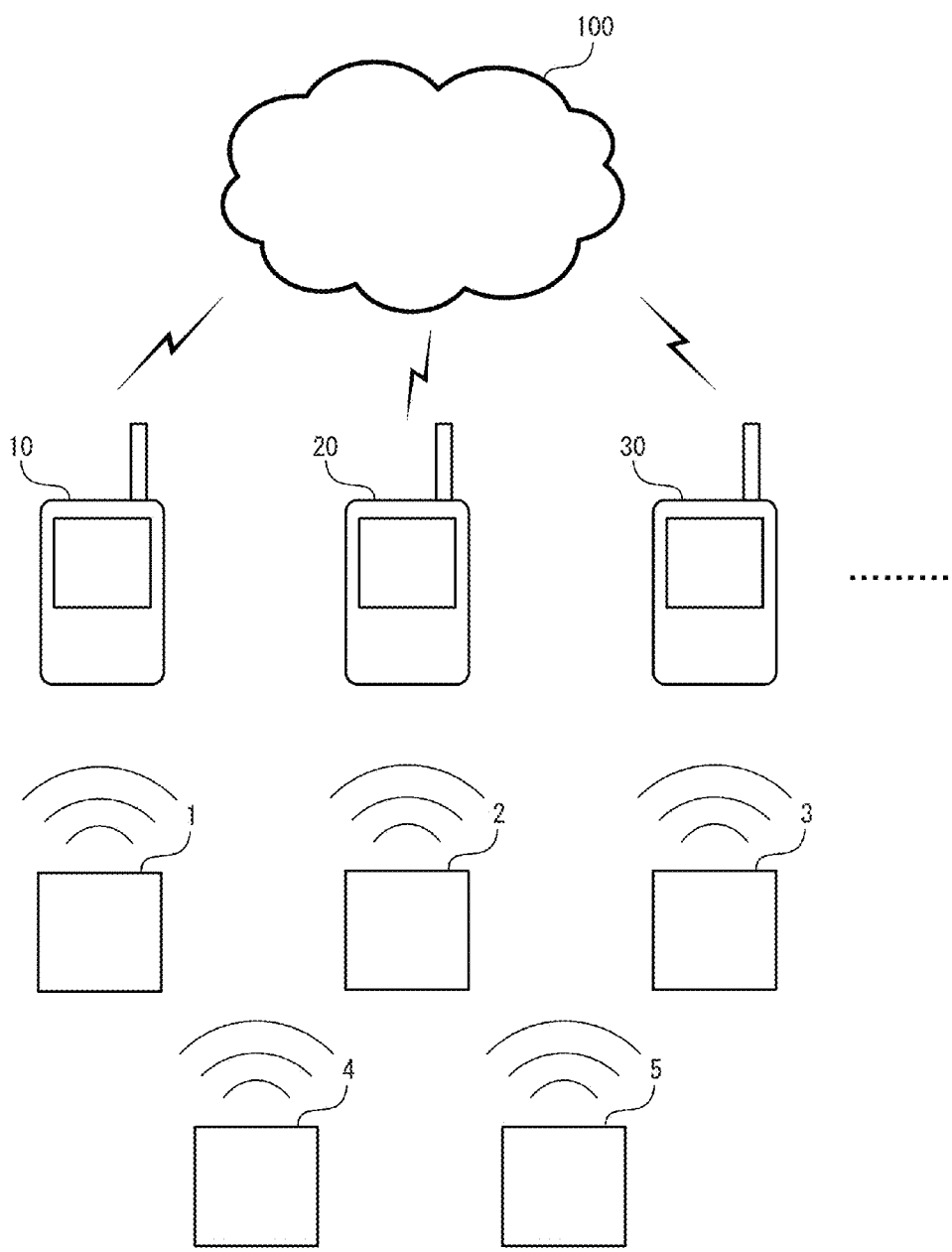
FIG. 1 illustrates an entire configuration example of an exemplary embodiment.

FIG. 1 illustrates an entire configuration example of the exemplary embodiment of the present disclosure.

The entire configuration example illustrated in FIG. 1 includes a radio communication terminal 10, a radio communication terminal 20 and a radio communication terminal 30, and a beacon device 1, a beacon device 2, a beacon device 3, a beacon device 4 and a beacon device 5. Since each of the radio communication terminals 10, 20 and 30 has the same configuration, the radio communication terminal 10 is used as a representative in the following explanation when there is no special need to distinguish one of the radio communication terminals 10, 20 and 30 from the others. As well, since each of the beacon devices 1, 2, 3, 4 and 5 has the same configuration, the beacon device 1 is used as a representative in the following explanation when there is no special need to distinguish one of the beacon devices 1, 2, 3, 4 and 5 from the others.

The radio communication terminal 10 is a mobile transmission and reception terminal such as a transceiver that is equipped with a transmitting function and a receiving function. The radio communication terminal 10 performs short-range radio communication with the beacon device 1 by Bluetooth. Further, the radio communication terminal 10 performs radio communication by a wireless LAN (Local Area Network) via a network 100 at an access point or the like with another terminal such as the radio communication terminal 20 or the radio communication terminal 30.

The beacon device 1 is located at a predetermined location, and transmits the beacon ID of the self-device as location identification information to identify the predetermined location. In the exemplary embodiment, beacon IDs assigned to the beacon devices 1 to 5, respectively, for easy understanding.

Figure 2:
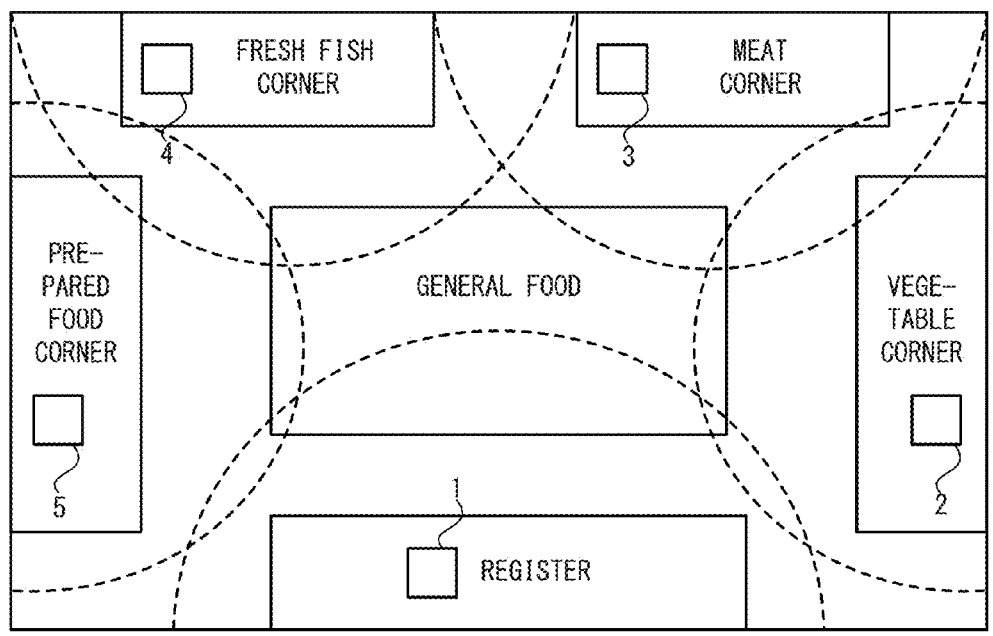
FIG. 2 illustrates an installation example of a plurality of beacon devices of the exemplary embodiment.

FIG. 2 shows an installation example with the plurality of beacon devices. In FIG. 2, each of the plurality of beacon devices is located at each of the predetermined locations (register, vegetable corner, meat corner, fresh fish corner and prepared food corner) in a supermarket. In each of the beacon devices, the signal strength of the beacon ID thereof to be transmitted has been previously adjusted to an extent just enough to cover each of areas displayed by broken lines in the figure.

Figure 3:
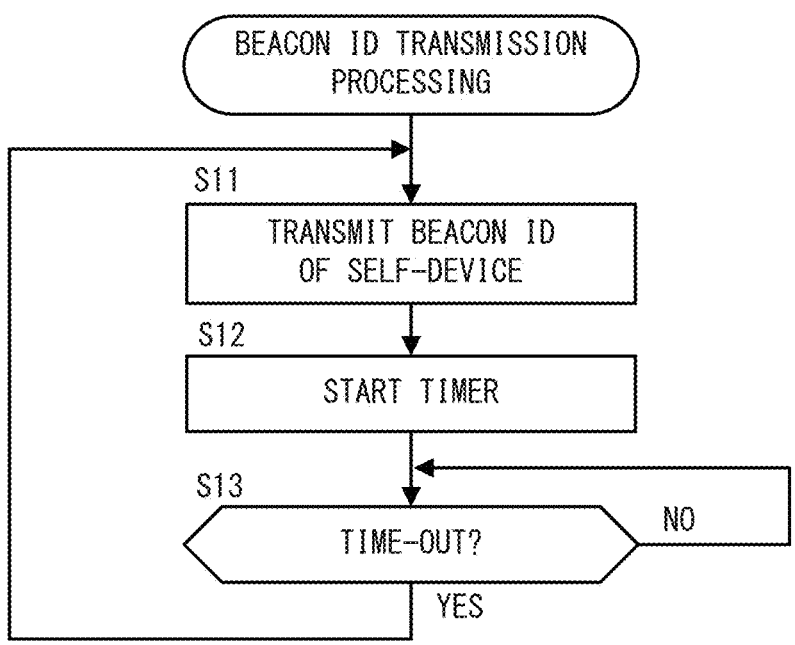
FIG. 3 illustrates an example of a flowchart of beacon ID transmission processing.

Beacon ID transmission processing performed by the beacon device 1 is now explained with reference to FIG. 3. The beacon device 1 starts the following processing sequentially when a user turns on the power of the beacon device 1 located at the predetermined location, or when a switch to start the transmission processing is pushed down.

First, the beacon device 1 transmits the beacon ID of the self-device (step S11). Specifically, the beacon device 1 transmits the beacon ID1 within the transmission range illustrated by the broken line in FIG. 2, as the location identification information for identifying the location of a register.

Next, the beacon device 1 starts a timer (step S12), waits until a time-out (No in step S13), and returns the processing back to step S11 upon the time-out (Yes in step S13). For example, the beacon device 1 starts the timer after setting the timer for one second, waits for one second, and transmits the beacon ID1 again after one second.

In other words, the beacon device 1 transmits the beacon ID1 in a predetermined interval set to the timer. Each of the beacon devices illustrated in FIG. 2 transmits the location identification information (beacon ID) thereof to the periphery thereof intermittently in a specified interval.

The configuration of the radio communication terminal 10 is explained with reference to the FIG. 4. The radio communication terminal 10 includes a controller 11, an inputter 12, a display 13, a memory part 14, a voice inputting and outputting part 15, a short-range radio communicator 16, and a radio communicator 17.

The controller 11 includes, for example, a CPU (Central Processing Unit) and a ROM (Read Only Memory). The controller 11 performs control based on a program stored in the ROM so as to provide various functions of the radio communication terminal 10.

The inputter 12 including for example a plurality of switches, is used by a user to input operation contents. The display 13 includes, for example, an LCD (Liquid Crystal Display) or an EL (Electroluminescence) display. The display 13 displays video in accordance with a video signal.

The memory part 14 including nonvolatile memory such as an HDD (Hard Disk Drive) stores data, tables or the like. The memory part 14 stores the management table illustrated in FIG. 5 as a table.

The management table is a table that includes a beacon ID that is location identification information, the location identified by the location identification information and a group address that is a channel, associated with one another. The group address is a multicast address in IP (Internet Protocol). The group address is assigned to each of the predetermined locations, thus allowing a transmitting side to perform broadcast transmission of voice data to the group address by the wireless LAN. A receiving side can receive voice data by setting the group address to be dada-receivable. This allows for voice communication between the transmitting side and the receiving side.

Each of the radio communication terminals always sets whole group address to be data-receivable. This allows each of the radio communication terminals to always receive the voice data transmitted to all of the terminals. On the other hand, each of the radio communication terminals switches the setting concerning permission or non-permission of data reception from each of the group addresses of the specified locations as a user (for example, a worker) of the self-terminal moves. This point is detailed later.

In FIG. 4 again, the voice inputting and outputting part 15 includes a microphone for inputting voice and a speaker for outputting voice. The voice inputting and outputting part 15 converts the voice collected by the microphone into voice data, and outputs voice from the speaker based on the voice data received via radio communication.

The short-range radio communicator 16 is an interface for short-range radio communication by Bluetooth. The radio communication terminal 10 receives, for example, the beacon ID1 from the beacon device 1, via the short-range radio communicator 16.

The radio communicator 17 is an interface for radio communication by wireless LAN via the network 100. The radio communication terminal 10 performs voice communication with another terminal, for example, the radio communication terminal 20, via the radio communicator 17.

The estimation processing for estimating a location of the self-terminal that is performed by the controller 11 of the radio communication terminal 10 is explained with reference to FIG. 6. The controller 11 starts the estimation processing in a predetermined interval (for example, every 6 seconds).

First, the controller 11 starts a timer for scanning (step S21), and scans beacon IDs (step S22). The scanning is an action for confirming whether any beacon ID is received.

Next, the controller 11 determines whether any beacon ID is received (step S23), and when receiving any beacon ID (Yes in step S23), the controller 11 stores the received beacon ID and the reception level thereof (step S24), and then advances the processing to step S25. Upon receiving no beacon IDs (No in step S23), the controller 11 advances the processing to step S25 by skipping step S24.

In step S25, the controller 11 determines whether a time-out has occurred, and when the time-out has not occurred (No in step S25), the controller 11 then returns the processing back to step S22 for scanning again. Thus, the controller 11 always keeps monitoring whether any beacon ID is received from the start of the timer for scanning until the time-out, and stores the received beacon ID, and the reception level thereof, if any.

It is necessary that the scanning time (Tscan) from the start of timer to the time-out be shorter than or equal to a predetermined interval for performing the estimation processing (Tintvl), that is, Tscan≤Tintvl. In addition, it is preferable that Tscan be N times longer than the transmission interval during which a beacon ID is transmitted.

Accordingly, when each of the beacon devices transmits the beacon ID thereof every second, Tscan may be, for example, three seconds that are three times longer than the transmission interval. In an example, the estimation processing is performed every six seconds, and the scanning is performed for three seconds within the period of six seconds.

In FIG. 6 again, after the time-out relevant to the scanning occurs (Yes in step S25), the controller 11 determines whether any beacon ID is received during the scanning (step S26). When determining that any beacon ID is received during the scanning (Yes in step S26), the controller 11 determines whether a plurality of beacon IDs are received (step S27).

When not receiving a plurality of beacon IDs (No in step S27), that is, the case where the number of the received beacon IDs is one, the controller 11 broadcasts the position information including the received beacon ID (step S28).

Specifically, when the number of the received beacon IDs (location identification information) is one, the controller 11 identifies the beacon device (predetermined location) identified by the beacon ID as the nearest beacon device, and estimates that the self-terminal is located in the position of the identified nearest beacon device. Then, the controller 11 broadcasts, to other terminals of the radio communication terminals 20 and 30 via wireless LAN, the position information (refer to FIG. 7) that shows the position of the self-terminal, and that includes the beacon ID of the nearest beacon device and the terminal ID of the self-terminal.

In an example, in the case that the received beacon ID is the beacon ID1, the controller 11 identifies that the register is the nearest to the self-device (radio communication terminal 10), and estimates that the self-terminal is located in the position of the register. Then, the controller 11 broadcasts the position information including the beacon ID1 and the terminal ID10.

On the other hand, upon determining that a plurality of beacon IDs are received (Yes in step S27), the controller 11 broadcasts the position information including the beacon ID having the highest reception level (step S29).

Specifically, in the case of receiving a plurality of beacon IDs (location identification information), the controller 11 identifies as the nearest beacon device the beacon device that is identified by the beacon ID having the highest reception level, and estimates that the self-terminal is located in the position of the identified nearest beacon device.

For example, in the case of receiving the beacon ID1, the beacon ID2 and the beacon ID3, the controller 11 compares the reception levels of the beacon IDs, and broadcasts the position information including the beacon ID having the highest reception level (for example, beacon ID2) and the terminal ID10.

Methods for comparing the reception levels of the beacon IDs include ones that compare the average values, the highest values or the central values respectively, of the reception levels may be compared. At that time, the beacon ID having the highest reception level can be identified more accurately if each of the beacon IDs is received frequently. Therefore, it is preferable that the scanning be performed as long as possible with a scanning time (Tscan) equal to or less than the predetermined interval for performing the estimation processing (Tintvl).

In FIG. 6 again, in the case that any beacon ID is not received during the scanning in step S26 (No in step S26), the controller 11 broadcasts the position information having no beacon ID (step S30). That is, the controller 11 empties the beacon ID and broadcasts the position information including solely the terminal ID10 of the self-terminal.

As mentioned above, by repeating the estimation processing in the predetermined interval (Tintvl) illustrated in FIG. 6, each of the radio communication terminals transmits the position information of the self-terminal to other radio communication terminals.

After the estimation processing illustrated in FIG. 6, each of the radio communication terminals identifies the group address assigned to the beacon ID of the nearest beacon device to the self-terminal, with reference to a management table. Then, each of the radio communication terminals sets the identified group address to be data-receivable and the other group addresses excluding the whole group not to be data-receivable.

For example, when the beacon ID of the nearest beacon device to the radio communication terminal 10 is 1 (beacon ID1), the controller 11 identifies the group address (224.1.1.101) assigned to the beacon ID1 (register) with reference to the management table. Then, the controller 11 sets the identified group address to be data-receivable and the other group addresses (from 224.1.1.102 to 224.1.1.105) excluding the whole group address (224.1.1.100) not to be data-receivable.

As above, each of the radio communication terminals changes setting contents every time when the nearest beacon device is changed as a user moves. Therefore, each of the radio communication terminals can receive, while staying in the periphery of the nearest beacon device to the self-terminal (nearest specified location), the voice data transmitted to the group address of the predetermined location.

Figures 7, 8:
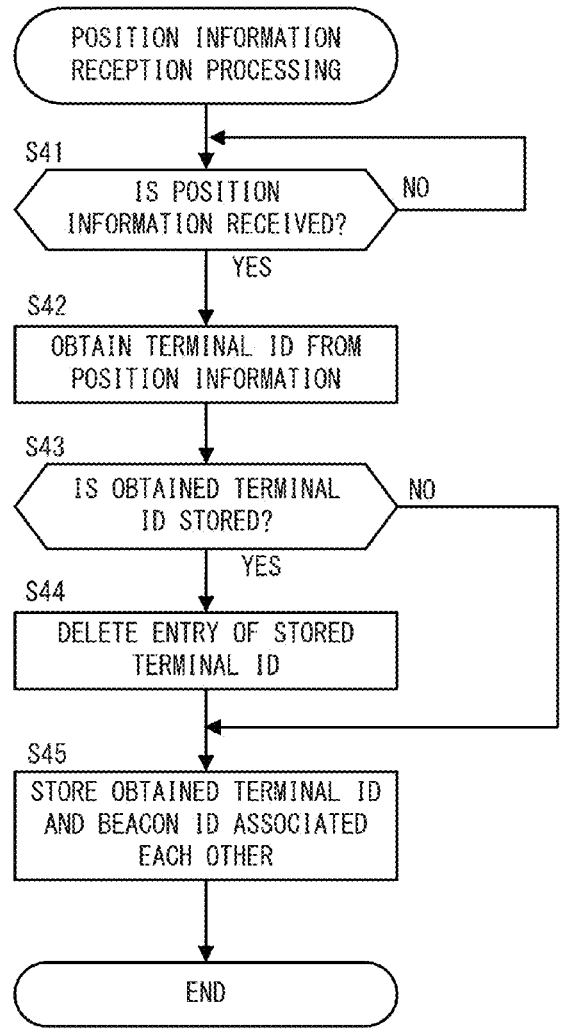
FIG. 7 illustrates an example of position information.
FIG. 8 illustrates an example of a flowchart of position information reception processing.

The position information reception processing performed by the radio communication terminal that receives the position information transmitted in the estimation processing illustrated in FIG. 6 is explained with reference to FIG. 8. The processing illustrated in FIG. 8 is explained based on an appropriate case in which the radio communication terminal 10 receives the position information transmitted from another terminal such as the radio communication terminal 20 or the radio communication terminal 30. The controller 11 of the radio communication terminal 10 is in a position information waiting state (No in step S41). Upon receiving the position information (Yes in step S41), the controller 11 performs the following steps sequentially.

The controller 11 obtains a terminal ID from the position information (step S42). For example, the controller 11 obtains the terminal ID20 from the position information of the other radio communication device 20.

Figures 9, 10:
FIG. 9 illustrates an example of a position table.
FIG. 10 illustrates an example of an operation screen for the radio communication terminal.

Next, the controller 11 determines whether the obtained terminal ID has been already stored (step S43). The controller 11 performs the determination with reference to a position table stored in the memory part 14. FIG. 9 shows one example of the position table. The position table is a table including a terminal ID, a beacon ID, and the location identified by the beacon ID, associated with one another. The radio communication terminal 10 can manage the positions of the other radio communication terminal 20 and the radio communication terminal 30 based on the position table.

In FIG. 8 again, in the case of determining that the obtained terminal ID has been already stored (Yes in step S43), the controller 11 deletes the entry of the terminal ID stored already (step S44), and stores the obtained terminal ID and the beacon ID, associated with each other (step S45). For example, the controller 11 deletes from the position information the entry of the obtained terminal ID20, and newly stores in the position table, the obtained terminal ID20, the beacon ID5, and the prepared food corner that is the predetermined location identified by the beacon ID5, associated with one another.

On the other hand, in the case of determining that the obtained terminal ID has not yet been stored (No in step S43), the controller 11 stores the obtained terminal ID and the beacon ID, associated with each other (step S45).

After step S45, the position information reception processing ends. By the processing, the radio communication terminal 10 can manage the latest positions of other terminals such as the radio communication terminals 20 and 30 in the position table based on the position information transmitted from other terminals such as the radio communication terminals 20 and 30. Then, the controller 11 can display an operation screen as illustrated in FIG. 10 on the display 13 of the self-terminal.

The operation screen displays respective predetermined locations and the numbers of the terminals, associated with each other. This allows a user to check at a glance, eight terminals in a whole supermarket, and the numbers of each of the eight terminals existing in the respective predetermined locations.

Figure 11:
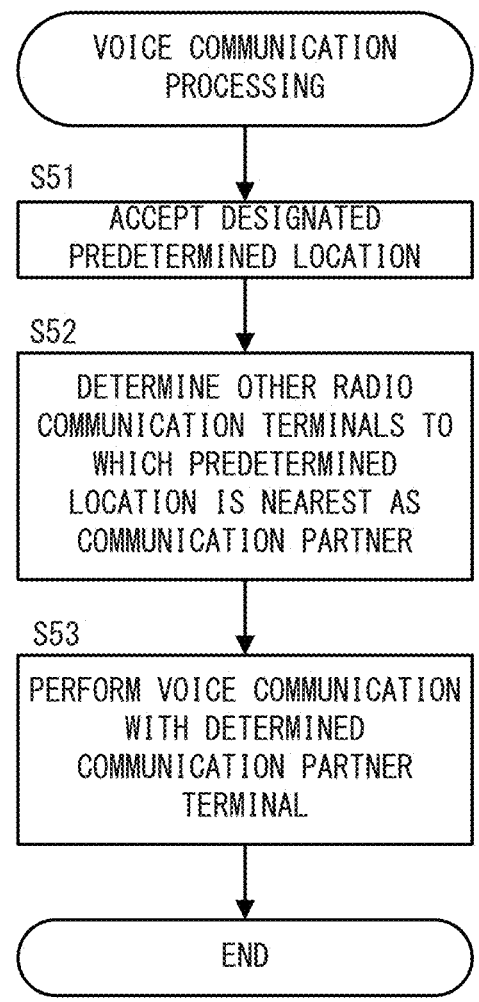
FIG. 11 illustrates an example of a flowchart of voice communication processing.

Voice communication processing by use of this operation screen is explained with reference to FIG. 11. The processing is triggered by specifying a predetermined location (in the example of FIG. 10, one of whole, register, vegetable corner, meat corner, fresh fish corner and prepared food corner) to which a user wants to make a call through the inputter 12.

First, the controller 11 accepts the designated predetermined location (step S51). In an example, the controller 11 accepts the fresh fish corner as the designated location.

Then, the controller 11 determines as a communication partner terminal, every other radio communication terminal to which the specified location is the nearest (step S52). Specifically, the controller 11 identifies all the terminal IDs associated with the specified location with reference to the position table, and then determines as communication partner terminals, the radio communication terminals respectively identified by the identified terminal IDs.

For example, the controller 11 identifies two terminal IDs associated with the fresh fish corner with reference to the position table, and determines as communication partner terminals, the radio communication terminals respectively identified by the two identified terminal IDs. It can be said that the controller 11 determines as communication partner terminals, the every radio communication terminal that transmits the position information including the beacon ID4 identifying the fresh fish corner and the terminal ID thereof. That is, the controller 11 determines as a communication partner terminal the every radio communication terminal to which the accepted specified location (for example, fresh fish corner) is the nearest, based on the terminal ID and the beacon ID included in the position information.

Next, the controller 11 performs voice communication with the determined communication partner terminal (step S53). Specifically, the controller 11 identifies the group address assigned to the accepted specified location with reference to the management table, and then transmits voice data to the identified group address. The communication partner terminal sets the group address to be data-receivable. Thus, in the case of one communication partner terminal, voice communication with the communication partner terminal can be performed; in the case of a plurality of communication partner terminals, group voice communication with the plurality of communication partner terminals can be performed.

For example, when the controller 11 transmits voice data to the group address (224.1.1.104) assigned to the accepted fresh fish corner, the radio communication terminal 10 can perform group voice communication with the two radio communication terminals as communication partner terminals. Here, other types of communication (for example, email communication) may be performed, not only the voice communication by wireless LAN.

In the exemplary embodiment explained above, the controller 11 of the radio communication terminal 10 accepts the designated specified location, and identifies every other radio communication terminal to which the accepted specified location is the nearest based on the received position information (beacon ID and terminal ID) to determine the identified communication terminal as a communication partner terminal. Then, the controller 11 performs voice communication with the determined communication partner terminal.

Therefore, a user can make a call to other person staying in the specific location. Accordingly, the use of the radio communication terminals 10, 20 and 30, and the like in the exemplary embodiment allows for communication such as a call limited in a specified location.

Further, the controller 11 of the radio communication terminal 10 receives a beacon ID identifying a predetermined location, and estimates the position of the self-terminal based on the received beacon ID. In the estimation processing, the controller 11 identifies the nearest specified location (nearest beacon device) based on the reception level of the beacon ID, and then estimates that the self-terminal is located in the identified nearest predetermined location. This estimation based on the reception level allows for accurate estimation of the position of the self-terminal.

In the exemplary embodiment, voice data are transmitted to a group address to perform voice communication with a determined communication partner terminal, but the embodiment is not limited to this. For example, when the determined communication partner terminal has an assigned unique address, voice data may be transmitted to the individual address. Specifically, the controller 11 identifies the terminal ID associated with the accepted specified location with reference to the position table, and may transmit voice data to the unique address of the identified terminal ID.

In the exemplary embodiment, digital group addresses are used as channels, but the embodiment is not limited to this. For example, an analog frequency band may be used as a channel. In this case, a different frequency band may be assigned to each of the beacon IDs (that is, each of the locations), instead of the group address in the management table illustrated in FIG. 5. A receiving side may change a receivable band when another beacon device becomes the nearest beacon device along with the movement of the receiving side, and a transmitting side may perform voice communication toward the band assigned to a desired location by use of a radio wave as a carrier.

The explanation about the exemplary embodiment has been completed, but the exemplary embodiment explained above is just one example, and naturally, the configuration, the contents of the processing and other points of the radio communication terminal 10 are not limited to those of the exemplary embodiment explained above.

Modification

Figure 12:
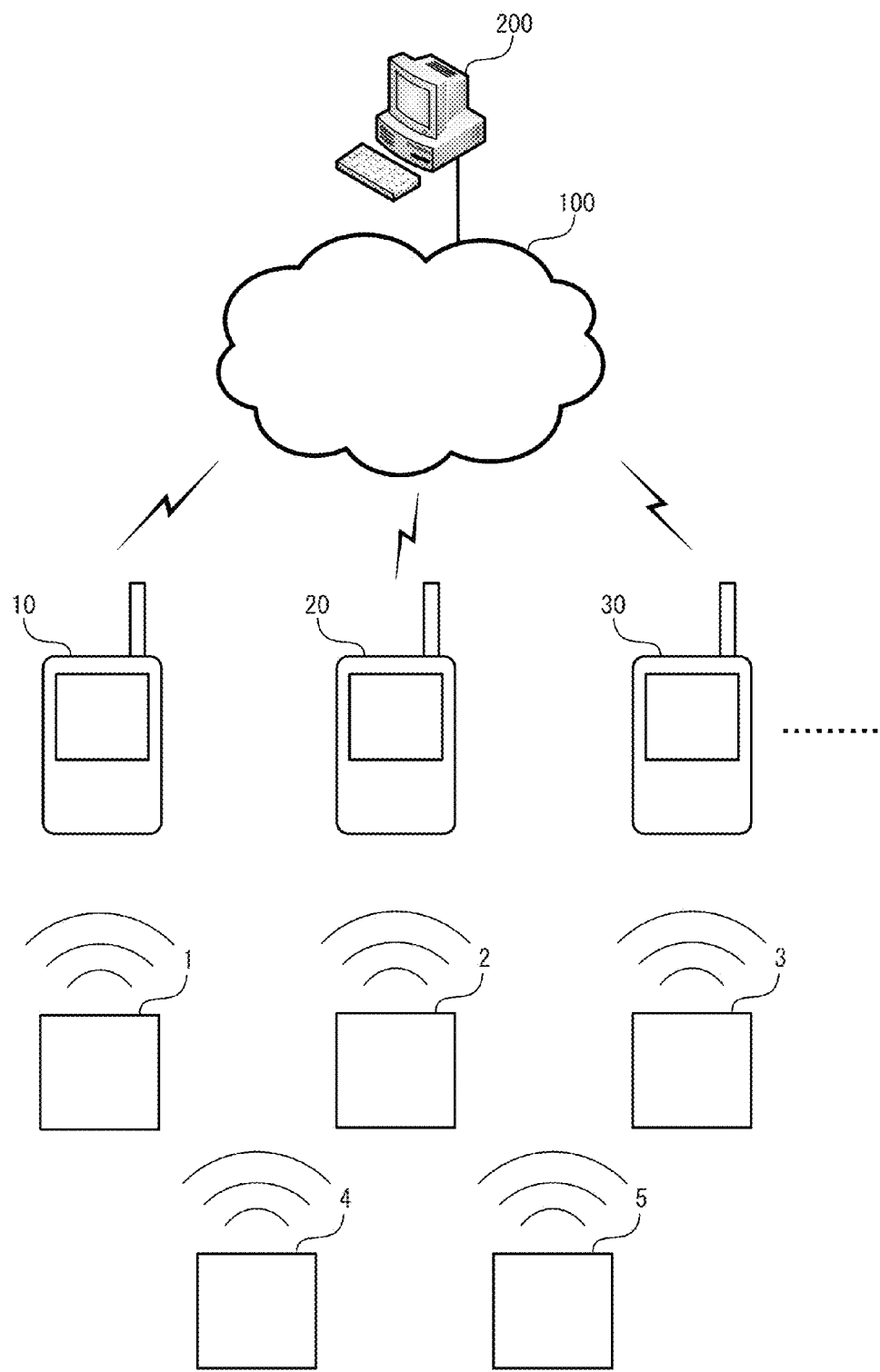
FIG. 12 illustrates an entire configuration example of a modification.

In the exemplary embodiment explained above, the entire configuration illustrated in FIG. 1 includes the radio communication terminals 10, 20 and 30, and the beacon devices 1 to 5, but the embodiment is not limited to this. For example, as a modification of FIG. 1, an entire configuration as illustrated in FIG. 12 may be available.

The modification is in a different configuration from the exemplary embodiment explained above, in the point of including a controlling device 200, and the point of including radio communication terminals 10, 20 30 having unique addresses, respectively. Further, the configuration of the modification is different from the exemplary embodiment, in the point where the controlling device 200 controls communication among radio communication terminals (for example, between the radio communication terminals 10 and 20). Hereafter, the different points are mainly explained.

The controlling device 200 stores a management table illustrated in FIG. 13. The management table includes an unique address list, instead of the group address in the management table illustrated in FIG. 5. In the unique address list, 192.168.1.101 corresponds to the unique address of the radio communication terminal 10; 192.168.1.102 corresponds to the unique address of the radio communication terminal 20; 192.168.1.103 corresponds to the unique address of the radio communication terminal 30; and each of 192.168.1.104 to 192.168.1.108 corresponds to the unique address of each of a plurality of other radio communication terminals.

The management table is created based on the position information transmitted from respective radio communication terminals. Specifically, the controlling device 200 obtains the beacon ID of the beacon device neatest to the radio communication terminal and the terminal ID of the radio communication terminal, from the received position information. Then, the controlling device 200 stores the beacon ID, the location identified by the beacon ID, and the unique address of the terminal ID, associated with one another in the management table.

The communication control among the radio communication terminals performed by the controlling device 200 is explained below, appropriately taking an example with the radio communication terminal 10 and the every other radio communication terminal nearest to a fresh fish corner.

It is assumed that a user of the radio communication terminal 10 specifies the fresh fish corner as a call destination. A controller 11 of the radio communication terminal 10 accepts the specified fresh fish corner, and transmits to the controlling device 200 the data showing that a call destination is the fresh fish corner (for example, a beacon ID4 that identifies the fresh fish corner), and voice data.

Upon receiving the data showing the specified location of the call destination (beacon ID) and voice data, the controlling device 200 identifies the individual address corresponding to the beacon ID with reference to the management table. Then, the controlling device 200 transmits the received voice data to the unique address.

When the received beacon ID is 4 (beacon ID4), the controlling device 200 identifies 192.168.1.104 and 192.168.1.107 based on the individual address list, creates two sets of voice data by copying, and transmits the created voice data respectively to the individual addresses. This allows for group voice communication between the radio communication terminal 10 and the two units of the radio communication terminals.

In the modification explained with reference to FIG. 12 and FIG. 13, the controlling device 200 controls communication (for example, voice communication) among respective radio communication terminals. There is no need for each of the radio communication terminals to store the position table including the received position information, thus allowing for reducing a processing load while reducing the storage capacity in each of the radio communication terminals.

Further, in each of the exemplary embodiments and the modifications, the explanation above is based on the voice communication limited to a specified location, but the embodiments and the modifications are not limited to this. In the explanation above, the beacon device set at a specified location transmits the location identification information (beacon ID) for identifying the specified location, but a portable beacon device, for example, may be used.

In this case, the beacon device transmits the identification information of the self-device to the periphery merely as a transmission source (or a mobile transmission source). The radio communication terminal that receives the identification information of the transmission source broadcasts the information for identifying the self-terminal (for example, terminal identification information) associated with the identification information of the transmission source. Another radio communication terminal receives and stores the broadcasted terminal identification information and the transmission source identification information associated with each other. In this method, merely by specifying one of transmission source identification information, a user of another radio communication terminal can communicate with the radio communication terminal having the terminal identification information associated with the designated transmission source identification information, as a communication partner terminal.

Specifically, a controller of another radio communication terminal (for example, a controller 11 of the radio communication terminal 10) may receive the transmission source identification information specified by a user, and determine another radio communication terminal identified based on the transmission source identification information as a communication partner terminal, thereby communicating with the determined communication partner terminal.

In each of the exemplary embodiments and the modifications explained above, the controller 11 of the radio communication terminal 10 realizes the functions relevant to the respective pieces of processing, but the exemplary embodiments and the modifications are not limited to this. For example, a plurality of controllers may share cooperatively the respective pieces of processing above to realize the functions relevant to the processing. In this case, there are a plurality of CPUs that are respectively included in the individual controllers, and each of the CPUs shares each piece of the processing cooperatively, thus realizing the functions explained above.

The radio communication terminal 10 of the present disclosure may be provided by use of a general computer, not by a special device. For example, a computer executes a program, which may realize the function of the radio communication terminal 10. A program to realize the function of the radio communication terminal 10 may be stored in a non-transitory computer-readable recording medium such as USB (Universal Serial Bus) memory, CD-ROM (Compact Disc Read Only Memory), DVD (Digital Video Disc), or HDD (Hard Disk Drive), or may be downloaded to the computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A radio communication terminal that comprises a radio communicator, the radio communication terminal comprising:
   a beacon receiver which receives beacon identification information from a beacon transmitter that is located at a location near the radio communication terminal from among a plurality of beacon transmitters respectively located at a plurality of locations, the beacon identification information being associated with the location;
   an information transmitter which wirelessly transmits the received beacon identification information and terminal identification information of the radio communication terminal in response to the reception of the beacon identification information associated with the location;
   a storage controller which, when it becomes possible to receive terminal identification information and beacon identification information transmitted by another radio communication terminal, receives the terminal identification information and the beacon identification information from the another radio communication terminal and stores in a memory the received terminal identification information and the beacon identification information in association with each other; and
   a communicator which, when a desired location is selected, identifies terminal identification information which is stored in the memory in association with the selected location, and selects a radio communication terminal to which the identified terminal identification information is assigned as a communication partner that is located at the desired location, thereby performing communication with the selected radio communication terminal;
   wherein:
   the beacon receiver receives a signal from the beacon transmitter that is located at the location near the radio communication terminal by repeatedly performing scanning to confirm whether beacon identification information is received from at least one of the plurality of beacon transmitters respectively located at the plurality of locations, thereby receiving the latest beacon identification information, and
   the information transmitter transmits, every time that the beacon receiver newly receives the beacon identification information, the newly received beacon identification information and the terminal identification information of the radio communication terminal.

2. The radio communication terminal according to claim 1, wherein when the beacon receiver receives beacon identification information from a plurality of the beacon transmitters respectively located at the plurality of locations, the information transmitter selects the beacon identification information having a highest reception level, and wirelessly transmits the selected beacon identification information and the terminal identification information.

3. The radio communication terminal according to claim 1, wherein when the terminal identification information and the beacon identification information are newly received from the another radio communication terminal, the storage controller determines whether the same terminal identification information as the newly received terminal identification information has already been stored in the memory, and when it has been determined that the same terminal identification information has already been stored in the memory, the storage controller updates stored contents of the stored terminal identification information by replacing the stored contents with the newly received terminal identification information and the beacon identification information.

4. The radio communication terminal according to claim 1, further comprising:
   a display controller which displays a list indicating a number of the radio communication terminals at each of the plurality of locations where each of the beacon transmitters is located, with reference to stored contents including the beacon identification information and the terminal identification information stored in the memory.

5. A radio communication method of a radio communication terminal that comprises a radio communicator, the method comprising:
   receiving a beacon signal including beacon identification information from a beacon transmitter that is located at a location near the radio communication terminal from among a plurality of beacon transmitters respectively located at a plurality of locations, the beacon identification information being associated with the location;
   wirelessly transmitting the received beacon identification information and terminal identification information of the radio communication terminal in response to reception of the beacon identification information associated with the location;
   when it becomes possible to receive terminal identification information and beacon identification information transmitted by another radio communication terminal, receiving the terminal identification information and the beacon identification information from the another radio communication terminal and storing the received terminal identification information and the beacon identification information in association with each other in a memory; and
   identifying, when a desired location is selected, terminal identification information which is stored in the memory in association with the selected location, and selecting a radio communication terminal to which the identified terminal identification information is assigned as a communication partner that is located at the desired location, thereby performing communication with the selected radio communication terminal;
   wherein:
   the receiving the beacon signal is performed by repeatedly performing scanning to confirm whether beacon identification information is received from at least one of the plurality of beacon transmitters respectively located at the plurality of locations, thereby receiving the latest beacon identification information, and
   the wirelessly transmitting comprises wirelessly transmitting, every time that beacon identification information is newly received, the newly received beacon identification information and the terminal identification information of the radio communication terminal.

6. The radio communication method according to claim 5, wherein when, in the receiving the beacon signal, beacon identification information is received from a plurality of the beacon transmitters respectively located at the plurality of locations, the wirelessly transmitting comprises selecting the beacon identification information having a highest reception level, and wirelessly transmitting the selected beacon identification information and the terminal identification information.

7. The radio communication method according to claim 5, wherein when the terminal identification information and the beacon identification information are newly received from the another radio communication terminal, the method further comprises determining whether the same terminal identification information as the newly received terminal identification information has already been stored in the memory, and when it has been determined that the same terminal identification information has already been stored in the memory, updating stored contents of the stored terminal identification information by replacing the stored contents with the newly received terminal identification information and the beacon identification information.

8. The radio communication method according to claim 5, further comprising:

displaying a list indicating a number of the radio communication terminals at each of the plurality of locations where each of the beacon transmitters is located, with reference to stored contents including the beacon identification information and the terminal identification information stored in the memory.

9. A communication system comprising a plurality of radio communication terminals each of which comprises a radio communicator, wherein a first radio communication terminal from among the plurality of radio communication terminals comprises:

a beacon receiver which receives beacon identification information from a beacon transmitter that is located at a location near the first radio communication terminal from among a plurality of beacon transmitters respectively located at a plurality of locations, the beacon identification information being associated with the location; and an information transmitter which repeatedly wirelessly transmits beacon identification information that can be currently received by the beacon receiver and terminal identification information of the first radio communication terminal in response to reception of the beacon identification information associated with the location, wherein:

the beacon receiver receives a signal from the beacon transmitter that is located at the location near the first radio communication terminal by repeatedly performing scanning to confirm whether beacon identification information is received from at least one of the plurality of beacon transmitters respectively located at the plurality of locations, thereby receiving the latest beacon identification information, and the information transmitter transmits, every time that the beacon receiver newly receives the beacon identification information, the newly received beacon identification information and the terminal identification information of the radio communication terminal, and wherein a second radio communication terminal from among the plurality of radio communication terminals comprises:

a storage controller which, when it becomes possible to receive the terminal identification information and the beacon identification information which are transmitted by the information transmitter of the first radio communication terminal, receives the terminal identification information and the beacon identification information from the first radio communication terminal and stores in a memory the received terminal identification information and the beacon identification information in association with each other; and a communicator which, when a location with which it is desired to communicate is selected, identifies terminal identification information based on beacon identification information corresponding to the selected location, the terminal identification information being stored in the memory, and selects a radio communication terminal to which the identified terminal identification information is assigned as a communication partner that is located at the desired location, thereby performing communication with a radio communication terminal to which the identified terminal identification information is assigned.

* * * * *